United States Patent [19]

Abbott

[11] 4,430,496

[45] * Feb. 7, 1984

[54] STRONG ANION EXCHANGE COMPOSITION AND METHODS

[75] Inventor: Seth R. Abbott, Concord, Calif.

[73] Assignee: Varian Associates, Inc., Palo Alto, Calif.

[*] Notice: The portion of the term of this patent subsequent to Mar. 30, 1999 has been disclaimed.

[21] Appl. No.: 359,173

[22] Filed: Mar. 16, 1982

Related U.S. Application Data

[63] Continuation-in-part of Ser. No. 112,964, Jan. 17, 1980, Pat. No. 4,322,542.

[51] Int. Cl.$^3$ .................. C07H 17/00; B01D 15/08
[52] U.S. Cl. .................. 536/27; 210/198.2; 210/635; 210/656; 536/28; 536/29
[58] Field of Search .................. 536/27, 28, 29; 210/198.2, 635, 656; 556/425

[56] References Cited

U.S. PATENT DOCUMENTS 4,290,892 3/1979 Abbott .................. 210/656
4,340,496 6/1981 Abbott .................. 210/656

Primary Examiner—Donald B. Moyer
Assistant Examiner—Shawn P. Foley
Attorney, Agent, or Firm—Stanley Z. Cole; Robert L. Price

[57] ABSTRACT

A strong anion exchange composition useful in monophosphate nucleotide isomer separations is comprised of an inert porous particle having a silyl alkyl ammonium compound fixedly attached by a covalent silicon-oxygen-silicon bond to the surface thereof. A process for synthesizing the strong anion exchange composition in an aqueous solvent is disclosed together with methods for separation of monophosphate nucleotide isomers, highly phophorylated nucleotides and aldopentose carbohydrates using a column packed with this strong anion exchange composition.

29 Claims, 4 Drawing Figures

SEPARATION OF CTCTAGAG ISOMERS

SEPARATION OF UMP AND AMP ISOMERS

SEPARATION OF GUANOSINE TETRA- AND PENTA-PHOSPHATES

SEPARATION OF ADENOSINE TETRA- AND PENTAPHOSPHATES

STRONG ANION EXCHANGE COMPOSITION AND METHODS

CROSS-REFERENCE TO RELATED APPLICATIONS

This application is a continuation-in-part of parent Application Ser. No. 112,964, filed Jan. 17, 1980, now U.S. Pat. No. 4,322,542 dated Mar. 30, 1982 and is related to U.S. Pat. No. 4,290,892.

TECHNICAL FIELD

This invention relates to a novel ion exchange composition, and, more specifically, to a strong anion exchange composition useful as a column packing material, and relates to a process for making the composition. The invention also relates to use of this strong anion exchange material in the chromatographic separation of biological isomers such as nucleotide isomers.

BACKGROUND ART

Inorganic column packings such as silica and alumina have been used for years for separation of a wide variety of basic neutral and acidic compounds. During the past few years increased interest in the separation of polar biological compounds which are sensitive to both pH and solvent has led to a great deal of work to modify the polar hydroxyl groups on inorganic packing materials. These modifications are necessary to prevent degradation of either the biological compound or the packing material.

Nucleic acid constituents have been separated by ion exchange chromatography using strong anion or cation exchange functions on cross-linked polystyrenedivinylbenzene resins. Exemplary is Kratovich and Roe, *Journal of Chromatography*, Vol. 155, 407 (1978), which describes the use of a polystyrene-divinylbenzene 8% cross-linked quaternary amine strong anion exchange column to achieve baseline separation of the 2'- and 3'-isomers of AMP and GMP and partial resolution of the 2'- and 3'-isomers of CMP and UMP.

It is known to modify a siliceous surface by reaction with monohalogenated silanes, silazanes or silylamines, or with monoalkyl or monoacetoxysilanes and to chemically modify the reaction product. This type of prior art is illustrated by U.S. Pat. No. 4,043,905 to Novotny et al. Similarly, modification of silica by reaction with benzyltrichlorosilane, followed by modification of the product to a benzylethylhydroxyl dimethyl ammonium ion is known. This type of prior art is exemplified by Unger and Nyamah, *Chromatographia*, Vol. 7, No. 2, 63–68 (1974). Also, it is known to form a silica having a quaternary ammonium ion bonded thereto by reacting chlorodimethyl [4-(4-chloromethylphenyl)butyl] silane with silica, followed by reaction with trimethylamine. This procedure produces a strong anion exchange composition, with a capacity of approximately 200 microequivalents/gram which only weakly retains and resolves some of the purine nucleotides. This type of art is exemplified by Asmus et al, *Journal of Chromatography*, Vol. 119, 25–32 (1976).

Furthermore, a silica modified with 3-chloropropyltrichlorosilane followed by triethylamine is known, as illustrated by Cox et al, *Journal of Chromatography*, Vol. 117, 269–278 (1976). However, this modified silica has a very low anion exchange capacity. The silica-silane reaction is carried out under reflux in dioxane.

Moreover, a proprietary strong anion exchange composition having a trimethylammonium ion bonded to a silica by an undisclosed linking group is known. This modified silica, known as Partisil-10 SAX (Whatman), is offered as a pellicular packing (37–50μ) and has very low capacity (10–15 μeq/g). In Whatman 1976, Bulletin 116, "Analysis of Nucleic Acid Constituents by High Performance Liquid Chromatography", the chromatogram at page 5, entitled "2', 3' Mononucleotides on Partisil-10-SAX", shows that this material produces only a partial resolution of the 2'- and 3'-monophosphate nucleotides of adenine, uracil, guanine, and cytosine.

Additionally, the reaction of silica with a substituted silane in water is known, as shown by Majors, *Journal of Chromatographic Science*, Vol. 12, 767 (1974). However, as described in FIG. 1 of this publication, a polymer is formed. The work of C. J. Bossart in *ISA Transactions*, Vol. 7, 283 (1968) appears to similarly form a polymer by the reaction in water at reflux of silica and a $C_6$-trichlorosilane. Thus, the prior art of which I am aware has not produced a strong anion exchange composition that is capable of achieving baseline resolution of 2'- and 3'-isomers of monophosphate nucleotides such as UMP and, furthermore, has not produced a strong anion exchange composition having this capability that also has high capacity. Additionally, this prior art fails to provide a process for forming a strong anion exchange composition in water, without polymer formation, from silica and a silane.

My copending applications, Ser. No. 953,380, filed Oct. 23, 1978, and Ser. No. 16,847, filed Mar. 2, 1979, now U.S. Pat. No. 4,290,892, describe the use of an aqueous solvent in reacting an amine-containing alkoxysilane such as N-2-aminoethyl-3-aminopropyltrimethoxysilane with a silica.

DISCLOSURE OF THE INVENTION

It is accordingly one object of the present invention to provide a novel strong anion exchange composition which is capable of providing baseline resolution of the 2'- and 3'-isomers of a monophosphate nucleotide such as UMP.

A further object of the present invention is to provide a strong anion exchange composition having this capability that has a high capacity.

An even further object is to provide a novel process for the liquid chromatographic separation of biological isomers such as a strong anion exchange composition.

Other objects and advantages of the present invention will become apparent as the description thereof proceeds.

In satisfaction of the foregoing objects and advantages, there is provided by the present invention a method for the chromatographic separation of a biological composition with a strong anion exchange composition comprising an inert porous particle having a size of about 3–20 microns and a silyl alkyl ammonium compound covalently attached to the surface of this particle. This composition is not a polymer and has a high capacity. The ammonium compound has the general formula:

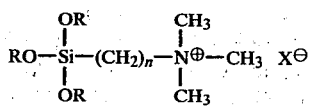

wherein n is an integer ranging from 2–5; R is methyl or ethyl; and X is an exchangeable anion.

Also disclosed is a process for the manufacture of this strong anion exchange composition, when the particle is microparticulate silica, that includes the steps of (a) degassing the silica and (b) reacting the ammonium compound with an aqueous slurry of the degassed silica at a time and temperature sufficient to produce the strong anion exchange composition. The ammonium compound is present in a stoichiometric excess ranging up to an about two- to three-fold excess, the excess being that of the ammonium compound to the reactive silanol sites of the silica. The temperature used is below that at which polymerization occurs.

The chromatographic method of the invention is directed to the separation of components contained in a biological composition, the steps of the method comprising:

(a) packing a column with a strong anion exchange composition comprising a microparticulate silica having a particle size of about 3 to about 20 microns, which has covalently attached to the silica surface a silyl alkyl ammonium compound having the general formula:

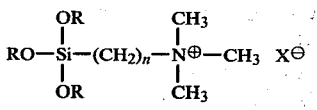

wherein R is methyl or ethyl; n is an integer ranging from 2 to 5; and X is an exchangeable anion;

(b) passing said biological composition through said column; and (c) recovering the separated components.

BRIEF DESCRIPTION OF THE DRAWINGS

Reference is now made to the drawings accompanying the application wherein.

BEST MODE FOR CARRYING OUT THE INVENTION

Figure 1:
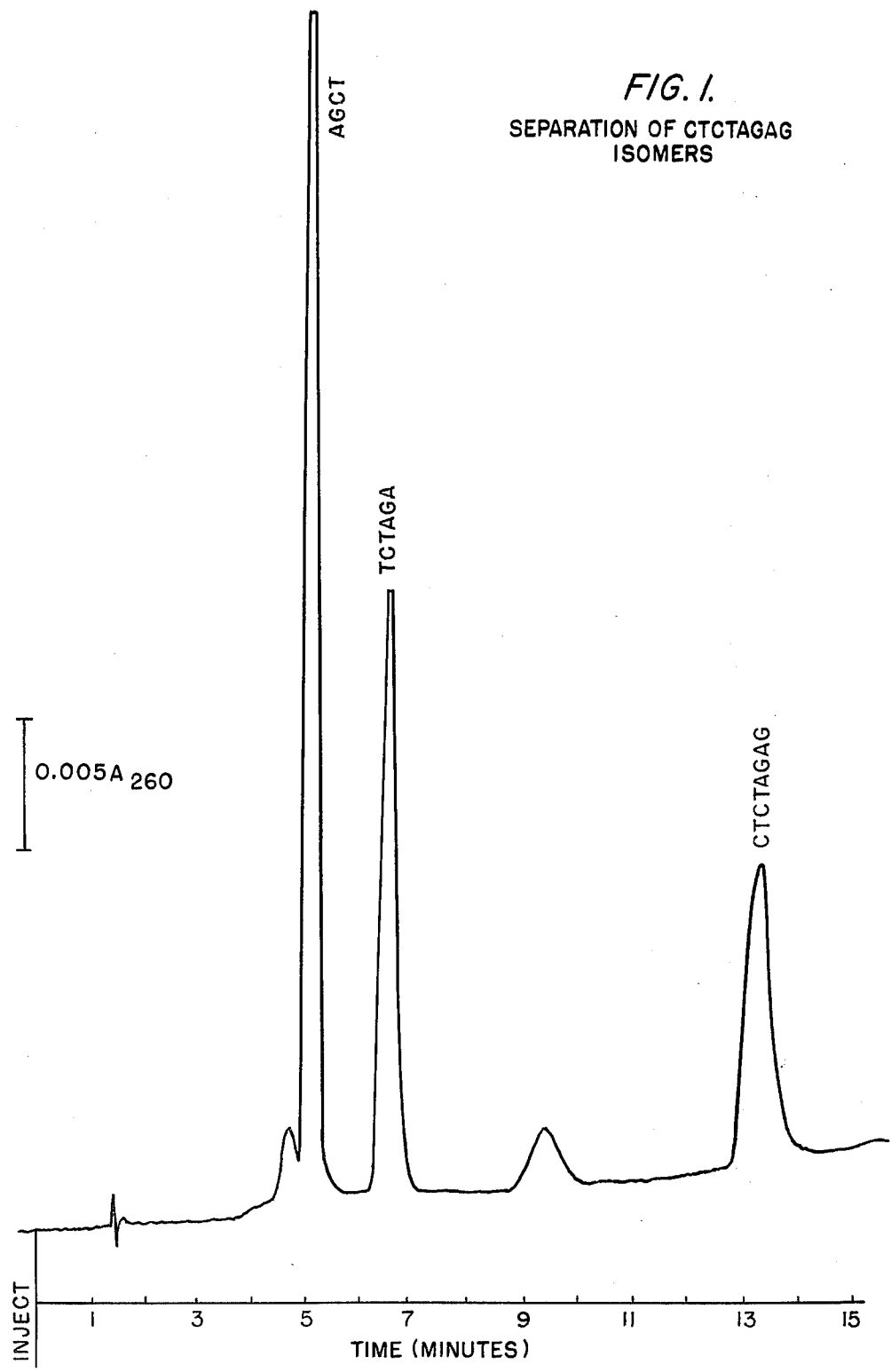
FIG. 1 is a chromatogram of oligonucleotides separated according to one embodiment of the invention.

As indicated above, one aspect of the present invention is concerned with the chromatographic separation of components contained in a biological composition such as nucleotides by use of a novel strong anion exchange composition. This composition is comprised of an inert porous particle to the surface of which is attached a silyl alkyl ammonium compound by covalent chemical bonding through a silicon-oxygen-silicon bond. The particle has a size in the range of from about 3–20 microns, with a size in the range of from about 3–10 microns being preferred.

The particle must be inert, i.e., it must be highly stable in organic solvents and in aqueous buffer solutions of pH about 2–8 at ambient temperature. Exemplary organic solvents in which the particle must be highly stable are hexane, methanol, isopropanol, ethanol, acetonitrile and tetrahydrofuran.

A particle that meets the above requirements is suitably microparticulate silica, alumina, zirconia and titania. Microparticulate silica is especially advantageous, and a high-pressure liquid chromatography (HPLC) grade silica gel is a particularly suitable type of this silica. An HPLC grade silica gel having a high surface area, i.e., about 50 to 800 m$^2$/g, a pore diameter of about 50 Å to 500 Å, and a size of about 3–10 microns is an especially suitable type of silica gel. A silica gel of this type is commercially available as 10 micron Lichrosorb ® Si-60, sold by Merck, Inc. However, any chromatography grade silica gel is suitable for use as the silica. While a microparticulate silica is the preferred particle, it will be understood that alumina, use of zirconia, and titania particles are also within the scope of the invention.

When employed in the anion exchange composition of this invention, the microparticulate silica can be used in an aqueous buffer solution of pH about 1–8 and alumina can be used in an aqueous buffer solution of pH about 1–10. Microparticulate silica, alumina, zirconia and titania are generally well known to those skilled in the art and, therefore, no further description thereof is provided.

The silyl alkyl ammonium compound is represented by the following formula:

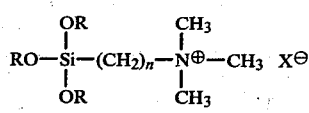

wherein n is an integer ranging from 2–5; R is methyl or ethyl; and X is an exchangeable anion such as a chloride anion and a phosphate anion. In particularly useful compounds of this type, n is 3. In these compounds, R is advantageously methyl. An exemplary compound is N-trimethoxysilane-propyl-N,N,N-trimethylammonium chloride, sold by Petrarch Systems, Inc. This compound forms a strong anion exchange composition having a capacity of about 750 μeg/g.

In the silica-containing strong anion exchange composition of this invention, the relatively hydrophobic organic outer portion of the composition provides protection to the silica inner portion against gradual attack by an aqueous solvent, by shielding the silica from the aqueous solvent. This shielding effect exists regardless of the type of particle selected, but is more important for certain of the particle types such as silica. Also, with this silica-containing embodiment of the strong anion exchange composition, charged polar silanol groups are eliminated from the silica surface by tying these groups to a covalent bond. The elimination of the disadvantages associated with silica avoids the adsorption and clogging problems experienced with prior art porous silica compositions.

The invention also provides a process for the manufacture of a strong anion exchange composition according to the present invention, which has microparticulate silica of the type described above as the particle.

In this process a silyl alkyl ammonium compound of the type described above is reacted with an aqueous slurry of the silica. As explained below, the stoichiometry of the reactants and the reaction temperature have critical limits which, if exceeded, result in polymerization. Water is advantageously used as the solvent for preparing the aqueous slurry. The ammonium compound can be reacted with a slurry of the silica in an organic solvent which is suitably acetonitrile or toluene. If an organic solvent were used, polymerization is considerably less of a problem, and thus the stoichiometry of the reactants and reaction temperature become less critical. However, reaction in the organic solvent is not normally used since a product having remarkably higher coverage is formed in the aqueous solvent. In preparing the slurry, there is advantageously used an amount of silica that will form an about 5–15% by weight slurry, with an amount of silica that will form an about 10% by weight slurry being preferred. A stoichiometric excess of the ammonium compound to reactive silanol sites on the silica is used in the reaction, to maximize the coverage with an about two- to three-fold excess being preferred and being the approximate upper limit. If too great an excess of the ammonium compound were used, then polymerization occurs.

The reaction is conducted for a time and a temperature sufficient to produce the strong anion exchange composition of the present invention, this composition being the silica with the silyl alkyl ammonium compound covalently bonded thereto. Suitably, the time is about 15 minutes to 24 hours, depending to a large extent upon the temperature selected, with a relatively higher temperature necessitating a relatively lower reaction time. At about ambient temperature, about 75% of the reaction is complete after about 1 hour and the reaction is substantially complete after about 2.5 to 3 hours. Thus, at this temperature, a reaction time of about 4 hours is preferred since completeness of reaction is assured. The temperature selected must be below that at which polymerization occurs, with about ambient temperature being particularly suitable.

Prior to carrying out the reaction, the slurry is degassed. Degassing is carried out to remove trapped air from the silica pores, in order to maximize the coverage. The degassing is carried out by a conventional technique. The reaction is then suitably commenced by adding the ammonium compound to the slurry. It is advantageous to then cap the reaction flask in order to prevent dust contamination.

After reaction, the product is recovered, washed and dried. Recovery is advantageously carried out by filtering the resulting reaction slurry. The filter cake is washed using a series of solvents to remove solvent-soluble impurities. An advantageous series of solvents is water, tetrahydrofuran and methanol. About 500–1500 milliliters of each of these solvents is suitably used in the washing, per 25 grams of material. Then, the filter cake is dried according to conventional procedures.

The strong anion exchange composition of the present invention is useful for separation of components contained in biological compositions which are suitable for such separations. It has been found that monophate nucleotide isomers and especially 2'- and 3'-isomers of such compounds are suitable for separation by this invention. In addition, this composition is useful for separation of highly phosphorylated nucleotides, which are important regulatory nucleotides involved in the control of RNA synthesis, and for separation of aldopentose carbohydrates such as ribose. Examples of highly phosphorylated nucleotides or "magic spots" are ppppG, ppGpp and pppGpp.

In practicing the method, this composition is packed into a chromatographic column preferably by forming a slurry in a balanced density solvent such as a tetrabromoethane-tetrachloroethylene solvent or a hexane solvent and adding the slurry at high pressure to the column. The tetrabromoethane-tetrachloroethylene solvent is suitably used for 10 micron silica particles and the hexane solvent is suitably used for 5 micron silica particles. An especially suitable mixture of tetrabromoethane and tetrachloroethylene is 60 parts to 40 parts. An about 5% slurry is used with advantage in packing the column. Advantageously, the packing pressure is about 6,000 to 20,000 p.s.i., with about 10,000 p.s.i. being particularly advantageous.

In practicing the method of the invention, a column such as a chromatographic column is packed with the strong anion exchange composition as described above. The biological composition to be separated into individual components is then passed through the column using chromatographic techniques which are known to the art. After the anion exchange composition is packed into the column as described above, the column is preferably prepared for use by washing with a series of solvents which are suitably methanol, water, phosphoric acid, and $KH_2PO_4$ (pH 3), for silica. After the column is prepared the biological composition is passed through the column at a suitable rate for retention of the materials to be separated. In the preferred embodiments, elution is obtained under pressure using a solvent combination for the particular materials contained in the composition.

As indicated above, the strong anion exchange composition is particularly suitable for the separation of monophosphate nucleotide isomers and similar compounds. It is, of course, known that regulatory nucleotides are useful in the control of bacterial RNA synthesis and high performance liquid chromatography such as that of the present invention is used to identify and quantitate components contained in these compositions. The strong anion exchange composition of this invention is remarkably selective for the 2'- and 3'-UMP isomers and can also be used for separation of 5'-mono-, di-, and triphosphate nucleotides. It is a particular feature of the invention that these materials can be separated in 3 hours or less and usually in less than one hour.

Many problems in biomedical research necessitate analysis of a broad spectrum of compounds in a single matrix. Changes in the composition of intracellular nucleotide pools are monitored as a means of correlating nucleic acid metabolism with the metabolic state of the cell or to characterize the phenotypes of cells with genetic alterations in nucleic acid metabolism. Nucleotides, nucleosides and bases are monitored in the body fluids of humans as a means of identifying elevated or altered patterns of nucleic acid metabolism in tissues, either as a means of disease diagnosis or to follow a course of therapy. The weak anion exchange composition of co-pending Application Ser. No. 16,847, filed Mar. 2, 1979, now U.S. Pat. No. 4,290,892, is especially useful for such class separations.

Adenosine monophosphate (AMP) isomer separation is particularly useful in the study of the binding of AMP isomers to clay substrates as a model for the prebiotic evolution of nucleic acids. However, the weak anion exchange composition of the co-pending application is limited in capability to resolve isomers of a given class. Thus, although a mixture of 2',3',5' and cyclic 3'-5' AMP isomers can be readily resolved isocratically with this weak anion exchange composition with baseline resolution using 0.01 M $KH_2PO_4$ (pH 2.95), the 2'- and 3'-isomers of uracil monophosphate (UMP), coelute under similar conditions. In contrast, the silica-containing stron anion exchange composition of the present invention readily enables separation of the 2'- and 3'-isomers of UMP, when a pH greater than about 4 is used.

The silica-containing composition of the present invention is suitable as a chromatography material at a pH of about 2–8, and is particularly suitable at a pH of about 3–5. As just explained, this material is useful for resolving 2'- and 3'-isomers of UMP when a pH greater than about 4 is used, with a pH of about 4–5 being particularly suitable, and a pH of about 4.5 being especially suitable. The chromatography is advantageously carried out at a pressure that does not exceed 500 atm.

Resolution into separate components of a mixture of 2'- and 3'-isomers of GMP, UMP, CMP and AMP is best achieved by first eluting the mixture on the weak anion exchange composition of co-pending Application Ser. No. 16,847, now U.S. Pat. No. 4,290,892, to isolate the GMP isomers from the UMP isomers from the CMP isomers and the AMP isomers, and then eluting each of the mixtures of 2'- and 3'-isomers on the strong anion exchange composition of this invention using 0.01 M $KH_2PO_4$ at pH>4.

Specific examples of the present invention are set forth below. Unless otherwise indicated, all percentages are by weight. These examples are merely illustrative and are not in any way to be interpreted as limiting the scope of the invention.

EXAMPLE I

A strong anion exchange material according to the present invention is prepared by the following process. A slurry in 250 ml distilled water of 25 grams of 10 micron Lichrosorb ® Si-60 (a microparticulate silica gel sold by Merck, Inc.) is prepared and then degassed in an ultrasonic bath for about 5 minutes using a water aspirator. To the degassed slurry there is added 50 ml of N-trimethoxysilylpropyl-N,N,N-trimethylammonium chloride (sold by Petrarch Systems, Inc., as a 50% solution in methanol), the reaction vessel is capped, and the reaction is allowed to proceed for 4 hours at room temperature. The reaction product is then filtered on a medium sintered glass filter funnel, and there is recovered on the funnel as a filter cake the desired strong anion exchange composition, which is a silica having the silylpropyl-N,N,N-trimethylammonium group covalently bonded thereto. The filter cake is washed with each of the following solvents, in turn: 500 ml water, 500 ml THF, 1000 ml THF, and 500 ml methanol. The washed cake is then dried.

EXAMPLE II

A 5% slurry of the silica produced in Example I in a 60/40 tetrabromomethane-tetrachloroethylene solvent system is packed in a 4 mm×30 cm column at 10,000 p.s.i. The packed column is washed with each of the following solvents in turn: 120 ml methanol, 120 ml water, 60 ml 0.1 M phosphoric acid, and 120 ml 0.01 M $KH_2PO_4$ (pH 3).

To this column, there is added a mixture of the 2',3',5', and cyclic isomers of guanosine monophosphate (GMP). Using 90 atm pressure, the column is eluted with 0.01 M $KH_2PO_4$ at pH 4.1 at room temperature. At a flow rate of 2 ml/min. the isomers are resolved in about 20 minutes.

EXAMPLE III

In this example, a chromatogram of oligonucleotides are separated in a column containing the strong anion exchanger described in Example II. The separation in this example is of a 4-mer, 6-mer, and 8-mer nucleotide isomers. The number or n in the term "n-mer" refers to the number of nucleotides linked together to form the oligomer. For example, CTCTAGAG is the 8-mer oligonucleotide cytidine-thymidine-cytidine-thymidine-adenosine-guanosine-adenosine-guanosine. In this example, the composition containing these components is introduced into the column of Example II and the column is eluted at room temperature. The solvents are (A) 1 M $KH_2PO_4$ at a pH of 6.5 with 5% ethyl alcohol and (B) 0.5 M $KH_2PO_4$ at a pH of 6.5 with 5% ethyl alcohol. The gradient was 0–40% of the 0.5 M $KH_2PO_4$ over a twenty minute period. The flow rate was 2 ml per minute and the amount injected is 0.013 $A_{260}$ units/10 ml each. The results of this example are shown in FIG. 1 where it will be seen that good separation of the isomers is obtained.

EXAMPLE IV

Figure 2:
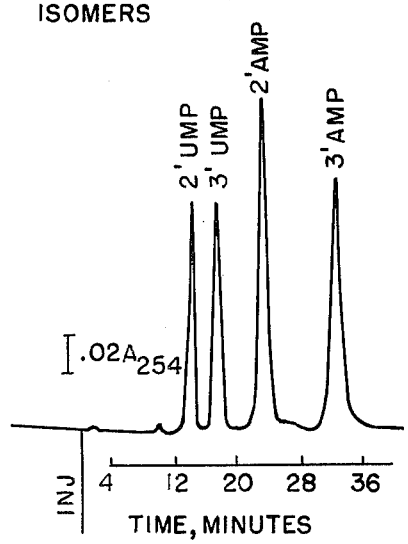
FIG. 2 is a chromatogram showing the separation of UMP and AMP isomers in a further embodiment of the invention.

To the column of Example II, a mixture of the 2'- and 3'-isomers of Uracil monophosphate (UMP) is added. The column is eluted with 0.02 M $KH_2PO_4$ at pH 4.5 at 30° C. At 2 ml/min. and at a pressure no greater than 120 p.s.i., the isomers are resolved in 20 minutes. The chromatogram of this separation is shown in FIG. 2.

EXAMPLE V

Figure 3:
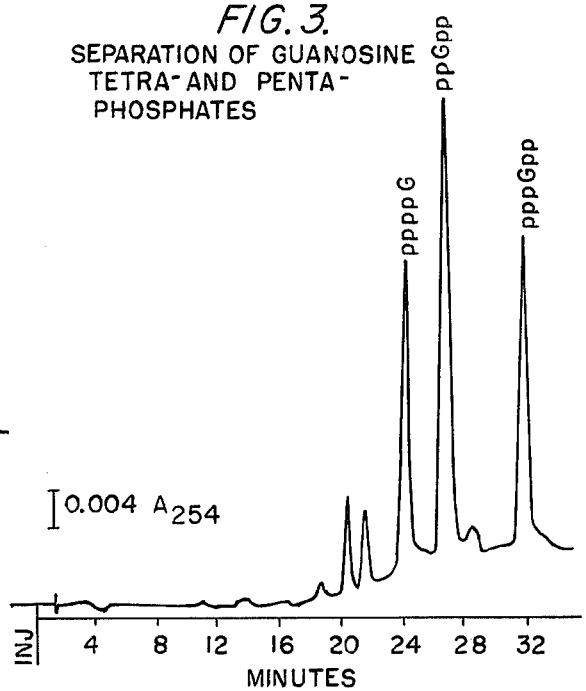
FIG. 3 is a chromatogram showing the separation of guanosine tetra- and pentaphosphates in a further embodiment of the invention; and, FIG. 4 is a chromatogram showing the separation of adenosine tetra- and pentaphosphates in a further embodiment of the invention.

To the column of Example II, there is added a mixture of guanosine tetra- and pentaphosphate isomers (ppppG, ppGpp and pppGpp). The column is eluted at 30° C. using 10–90% of 0.75 M $KH_2PO_4$ per minute gradient elution for the gradient at a pH of 4.5. At a flow rate of 2 ml/min. and at a pressure no greater than 500 atm., the isomers are resolved in 32 minutes. The chromatogram for this separation is shown in FIG. 3.

EXAMPLE VI

Figure 4:
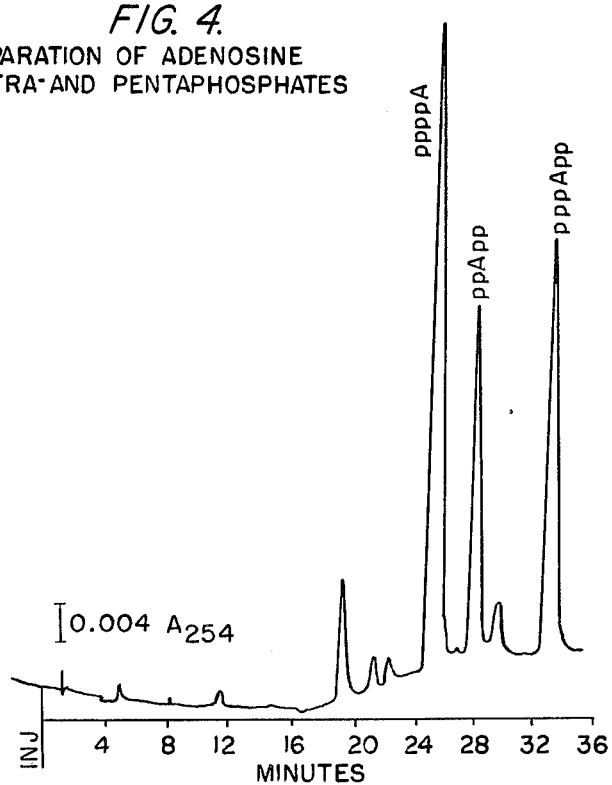

Following the procedure of Example IV, adenosine tetra- and pentaphosphate isomers (pppA, ppApp and pppApp) are resolved in 33-34 minutes using as the elutant 0.75 M $KH_2PO_4$ at a pH of 4.5. The flow rate is 2.0 ml/min. The chromatogram for this separation is shown in FIG. 4.

EXAMPLE VII

To the column of Example II, there is added a mixture of ribose, fructose, dextrose and sucrose. The column is eluted at 30° C. with 70% acetonitrile to 30% water. At a flow rate of 2 ml/min. and at a pressure of about 70 atm., 100% recovery of ribose is obtained within 5 minutes. The ribose is the first component of the mixture off the column.

The invention has been described herein with reference to certain preferred embodiments; however, as obvious variations thereon will become apparent to those skilled in the art, the invention is not to be considered as limited thereto.

What is claimed is:

1. A method for the separation of components contained in a biological composition, the steps of the method comprising:

(a) packing a column with a strong anion exchange composition comprising an inert porous particle having a particle size of about 3 to about 20 microns which has covalently attached to the silica surface a silyl alkyl ammonium compound having the general formula:

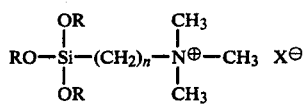

wherein R is methyl or ethyl; n is an integer ranging from 2 to 5; and X is an exchangeable anion;

(b) passing said biological composition through said column; and, (c) recovering the separated components.

2. The method of claim 1 wherein said column is a high-pressure liquid chromatography column.

3. The method of claim 2 wherein the particle of the strong anion exchange composition is selected from a group consisting of microparticulate silica, alumina, a cross-linked dextran, and a cross-linked polystyrene-divinylbenzene resin.

4. The method of claim 3 wherein the particle of which said strong anion exchange composition is comprised is microparticulate silica.

5. The method of claim 4 wherein said silica is a high-pressure liquid chromatography grade silica gel.

6. The method of claim 2 wherein the said biological composition separated by said strong anion exchange composition is comprised of members of a group consisting of nucleic acid components, amino acids, and dicarboxylic acids.

7. The method of claim 6 wherein the said biological composition separated by said strong anion exchange composition is a mixture of nucleic acid components.

8. The method of claim 1 wherein said particle size is about 3-10 microns.

9. The method of claim 1 wherein n is 3.

10. The method of claim 9 wherein R is methyl.

11. The method of claim 1 wherein said ammonium compound is N-trimethoxy silyl-propyl-N,N,N-trimethylammonium chloride.

12. A liquid chromatographic column comprising an elongated tube, a strong anion exchange composition packed into said tube, said strong anion exchange composition comprising an inert porous particle having a size of about 5 to 20 microns and having attached to the surface of said inert porous particle by covalent bonding a silyl alkyl ammonium compound having the general formula:

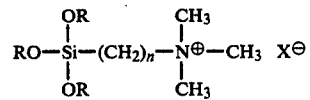

wherein R is methyl or ethyl; n is an integer ranging from 2 to 5; and X is an exchangeable anion, said strong anion exchange composition being capable of simultaneous separation of mixtures of polyfunctional compounds and isomers thereof.

13. The column of claim 12 wherein said column is a high-pressure liquid chromatography column.

14. The column of claim 13 wherein the particle of the strong anion exchange composition is selected from a group consisting of microparticulate silica, alumina, a cross-linked dextran, and a cross-linked polystyrene-divinylbenzene resin.

15. The column of claim 14 wherein the particle of which said strong anion exchange composition is comprised is microparticulate silica.

16. The column of claim 15 wherein said silica is a high-pressure liquid chromatography grade silica gel.

17. The column of claim 14 wherein said particle size is about 5-10 microns.

18. The column of claim 12 wherein n is 3 and R is methyl.

19. The column of claim 12 wherein said ammonium compound is N-trimethoxy silyl-propyl-N,N,N-trimethylammonium chloride.

20. A method for performing liquid chromatography comprising placing a solution of a composition comprising a mixture of polyfunctional compounds and isomers thereof on the head of a chromatographic column, flowing a solvent system through said chromatographic column, wherein said chromatographic column is packed with a packing material comprising a strong anion exchange composition, said strong anion exchange composition comprising an inert porous particle having a size from about 3 to 20 microns which has covalently attached to its surface a silyl alkyl ammonium compound having the general formula:

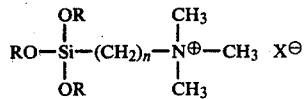

wherein R is methyl or ethyl; n is an integer ranging from 2 to 5; and X is an exchangeable anion; wherein said strong anion exchange composition is capable of simultaneous separation of mixtures of polyfunctional compounds and isomers thereof.

21. The method of claim 20 wherein said column is a high-pressure liquid chromatography column.

22. The method of claim 21 wherein the particle of the strong anion exchange composition is selected from a group consisting of microparticulate silica, alumina, a cross-linked dextran, and a cross-linked polystyrene-divinylbenzene resin.

23. The method of claim 22 wherein the particle of said strong anion exchange composition is comprised is microparticulate silica.

24. The method of claim 23 wherein said silica is a high-pressure liquid chromatography grade silica gel.

25. A method for the separation of nucleotide isomers on a chromatographic column, the steps of the method comprising:

(a) packing a column with a strong anion exchange composition comprising a microparticulate silica having a particle size of about 3 to about 20 microns which has covalently attached to the silica surface a silyl alkyl ammonium compound having the general formula:

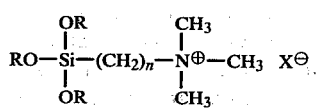

wherein R is methyl or ethyl; n is an integer ranging from 2 to 5; and X is an exchangeable anion;
(b) passing said nucleotide isomer composition through said chromatographic column; and
(c) recovering the separated components.

26. The method of claim 25 wherein the said nucleotide isomers separated by said strong anion exchange composition are comprised of members of a group consisting of nucleic acid components, amino acids, and dicarboxylic acids.

27. The method of claim 26 wherein the said nucleotide isomers comprise a mixture of nucleic acid components.

28. The method of claim 25 wherein n is 3 and R is methyl.

29. The method of claim 25 wherein said ammonium compound is N-trimethoxy silyl-propyl-N,N,N-trimethylammonium chloride.

* * * * *